United States Patent [19]
Oremland

[11] Patent Number: 6,068,551
[45] Date of Patent: May 30, 2000

[54] TRUNK VENTILATOR

[76] Inventor: George Alan Oremland, 179 Regatta Dr., Jupiter, Fla. 33477

[21] Appl. No.: 08/985,151

[22] Filed: Dec. 4, 1997

[51] Int. Cl.$^7$ .................................................. B60H 1/24
[52] U.S. Cl. ........................................... 454/165; 454/162
[58] Field of Search .............................. 454/69, 136, 162, 454/164, 165, 351, 349, 352, 353

[56] References Cited

U.S. PATENT DOCUMENTS

| | | | |
|---|---|---|---|
| 4,217,816 | 8/1980 | Mancinelli | 454/69 |
| 4,445,426 | 5/1984 | Bohanon, Sr. | 454/69 |
| 4,633,769 | 1/1987 | Milks | 454/69 |
| 4,895,065 | 1/1990 | Lamparter | 454/69 |
| 4,942,806 | 7/1990 | Hwang | 454/69 |

*Primary Examiner*—Harold Joyce
*Assistant Examiner*—Derek S. Boles
*Attorney, Agent, or Firm*—McHale & Slavin PA

[57] ABSTRACT

Disclosed is a trunk ventilating device that operates to elevate or reduce the temperature of the vehicle trunk or trunk-like area. The device will accommodate a conventional rear deck of an automobile and provides a sealing aspect between the occupant area and the trunk area with the use of louvers that are made operational upon demand by the vehicle operator. The vehicle operator may initiate a dash mounted control switch that operates a high speed fan capable of drawing air from the occupants seating area into the otherwise sealed trunk area providing the proposed temperature elevation or reduction. Louvers are gravity or spring biased. It includes an aperture covering so as to prevent items from entering the trunk or engaging the rotating fan. A separate embodiment encompasses the use of a remotely located fan for areas lacking a definable trunk area for the purpose of transferring conditioned air from one part of the vehicle to another. Transfer duct includes a fan without louvers for purposes of pushing conditioned air, such as from the foot well of the occupant's area to an otherwise unconditioned portion of the rear of the vehicle in either a temporary or permanent fashion.

7 Claims, 9 Drawing Sheets

TRUNK VENTILATOR

FIELD OF THE INVENTION

This invention is related to the field of automobiles and, in particular, to a device for conditioning the air in an automobile trunk by transfer of air from the passenger compartment.

BACKGROUND OF THE INVENTION

The trunk of an automobile provides a secure area for transporting various items. For instance, the trunk of an automobile is commonly used to transport groceries from a grocery store to a consumer's home. A problem with transferring items within a trunk space is that the space is not properly conditioned for transfer of perishable items. The temperature in a trunk space can easily exceed 150 degrees Fahrenheit or be well below freezing. Dairy and meat products can quickly spoil under such conditions.

When the automobile is used for transporting, in either an extremely warm or extremely cold environment, care must be taken to prevent spoilage of food. Typically consumers place the grocery items within the passenger seating area for transportation purposes. However, it is not always convenient to place grocery items in the passenger seating area since the items take up occupant space and is dangerous to passengers since unsecured items can become lethal projectiles during an accident.

Should the automobile be used in a cold environment, the grocery items placed in a trunk may be subject to freezing. This can also pose a danger for liquids, especially carbonated liquids, can literally explode if frozen. Further, the thawing and freezing of food can lead to accelerated spoilage.

What is needed is a device for controlling the temperature in the trunk of an automobile allowing the transfer of perishable items in a secure area.

SUMMARY OF THE INVENTION

The instant invention is an electrically operated ventilation system that is positionable on the rear deck of a sedan style automobile. The ventilation system includes a high volume fan and louver system for use in forcing air from the passenger seating area into the trunk space. The louvers are spring biased and open in response to fan-forced air flow to allow ventilation of the trunk upon the passage of air from the occupant seating area. In operation, the vehicle operator initiates a dash-mounted switch to cause fan operation. The fan causes air from the passenger compartment to be drawn into the trunk space. When the fan operates, the louvers will automatically open to accommodate the passage of air.

The forced air causes the trunk space, in a warm environment, to receive air-conditioned air causing the trunk to remain cool. On a normal, sunny afternoon, the temperature of a trunk may quickly exceed 150 degrees, leading to rapid spoilage of the groceries placed therein. In this condition, the vehicle operator may initiate the fan switch to force air-conditioned air from the passenger compartment into the trunk. This forced ventilation will lower the trunk temperature to a level which approximates the temperature of the passenger compartment and, in some instances, lower the temperature even further since the trunk is a shaded area versus the passenger compartment, which is surrounded by glass. The lowered temperature helps prevent premature spoilage of food.

In an environment where the temperature is below freezing, the placement of groceries within the trunk could subject the groceries to freezing. In this situation, the vehicle operator may again initiate the device so as to cause the louvers to open allowing for a forced ventilation into the trunk area. The temperature in the trunk is raised as the warm air is drawn from the passenger seating area to prevent items placed in the trunk from reaching a freezing temperature. Juices, pops, and other liquids will remain cold but will not freeze.

An alternative embodiment of the instant invention is a concealable duct or canister-type ventilation system having an intake portion positioned along the floor of an automobile rear seat. As with the first embodiment, a high volume fan allows forced ventilation with a flexible duct having an exhaust port inside the a trunk space. This embodiment is preferred for automobiles having a hatch back or similar design that lack a conventional rear deck. The duct work allows air to be transferred to the trunk area even without a rear deck causing the trunk area to have a temperature consistent to the passenger compartment temperature.

The canister embodiment may be placed in several types of configurations, both temporary and permanent. A dash mounted toggle switch operates a low voltage high volume fan for transferring of air from one location of the automobile to the remote location. As with the previous embodiment, the trunk space can be ventilated to selectively increase or reduce the temperature in the trunk-like area.

This device is further suitable for sport-utility vehicles, where children or small animals are often placed in a poorly-ventilated area at the rear of the vehicle. With the present device, occupants placed in the rear of the vehicle will be ensured a fresh flow of comfortable air. Pets, for example, may be properly placed in a cage during travel. The present device allows the ventilation duct to be placed at a position near animals or children in the rear of a vehicle.

Thus, an objective of the instant invention is to disclose a low cost device that can be inserted in a new or used automobile for conditioning the trunk space of the automobile.

Another objective of the instant invention is to disclose a rear-deck mounted device having louvers that automatically open upon operation of a high volume fan to force a one-way transfer of air from the passenger compartment to the trunk space.

Yet another objective of the instant invention is to disclose a device for conditioning the trunk space of an automobile to approximate the temperature of the passenger area of an automobile.

Still another objective of the instant invention is to disclose a flexible duct that allows for ventilation of a cargo-holding area by the use of a flexible duct that selectively ventilates the area in response to driver controls.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
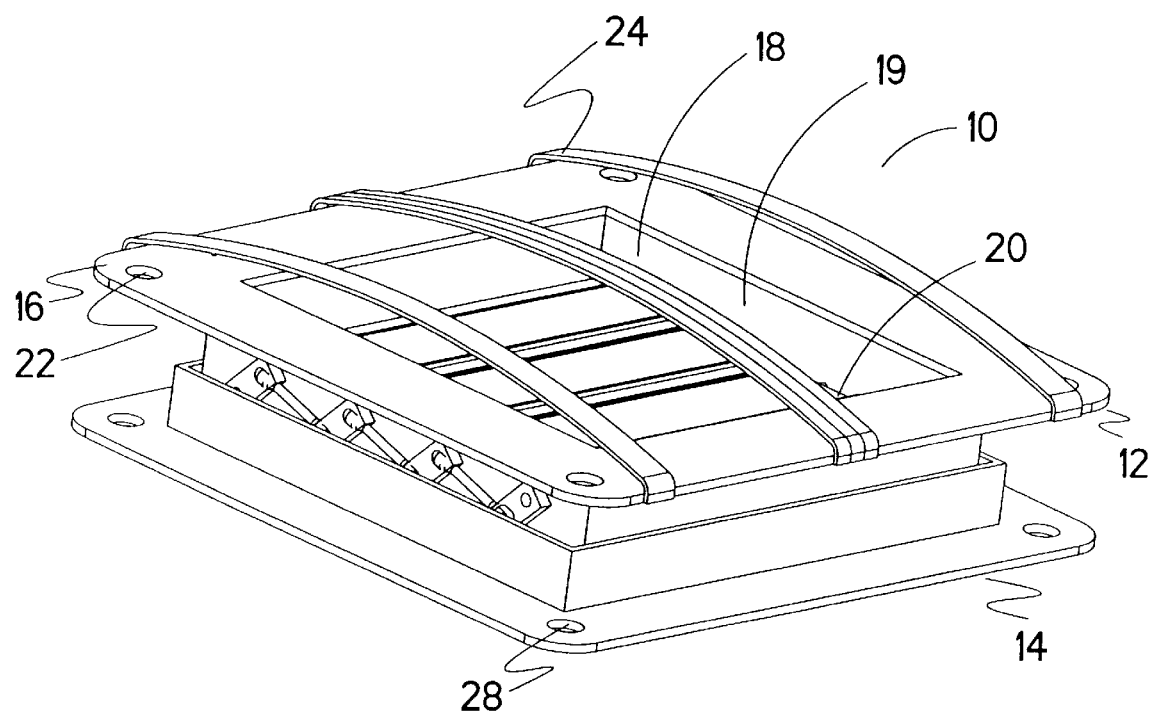
FIG. 1 is a perspective view of the trunk ventilation device according to the instant invention.
Figure 2:
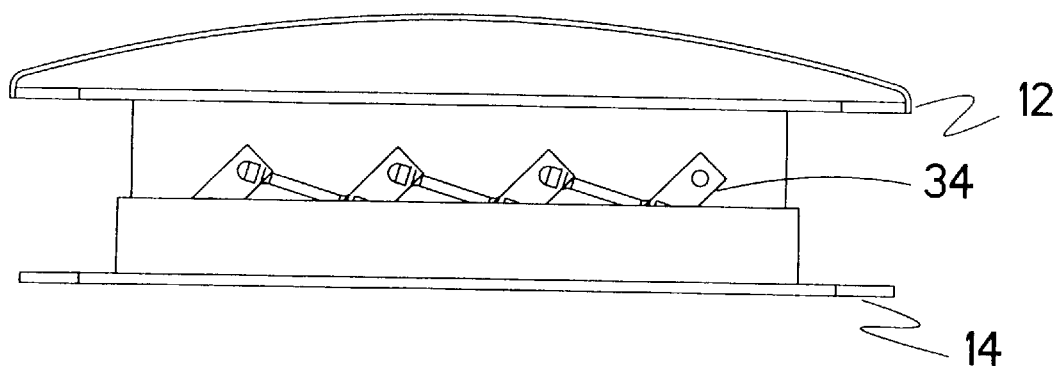
FIG. 2 is a side view of the trunk ventilation device depicting the top portion of the device.
Figure 3:
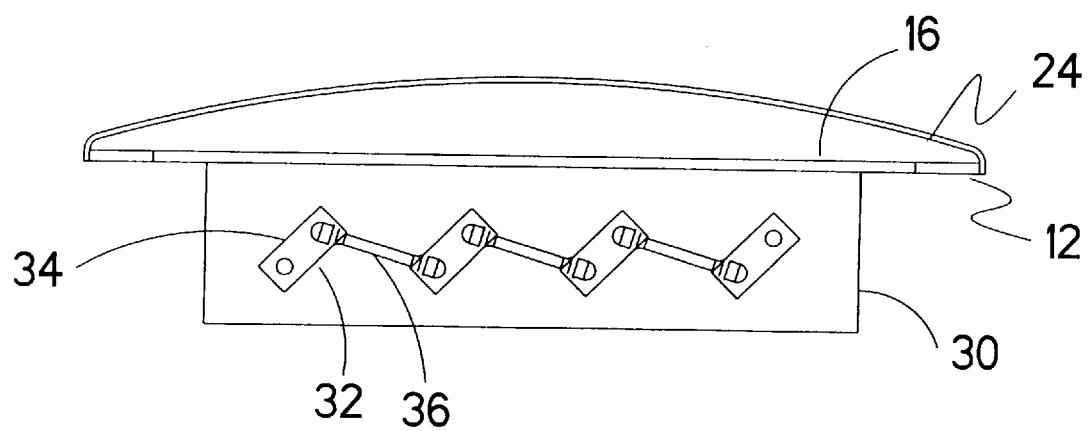
FIG. 3 is a side view of the instant invention depicting the bottom portion of the device engaging top portion as set forth on FIG. 2.

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Now referring in general to FIGS. 1–4, set forth is a perspective view of the instant invention 10, having an upper portion structure 12, and a lower portion structure 14. The upper portion structure 12 is defined by a square shape having a lower surface 15 and a finished upper surface 16 with four side edges and a centrally-disposed aperture 18. The aperture 18 is sealed by use of louvers 20 that are pivotedly secured along opposing side walls of said aperture. The upper portion structure 12 is enlarged to operate as a flange for securing the structure to the top of a rear deck of a conventional automobile by the use of fasteners 40 that pass through mounting holes 22 located at each corner of the structure.

Similar to the upper portion structure 12, the lower portion structure 14 includes a reciprocally shaped outwardly extending flange which secures the structure to the bottom of the rear deck of an automobile. The flange area has an upper surface 27, a lower surface 29, and includes four mounting holes 28, one located at each outer corner to accommodate fasteners 40 wherein the upper and lower structures operate to sandwich the vehicle rear deck 100 therebetween. In this manner the upper mounting holes 22 may be aligned with corresponding lower mounting holes 28 and fitted with fasteners 40 shaped and sized to engage securing bolts passing through the mounting holes 22. The upper portion structure 12 cooperates with the lower portion structure 14 to engage the rear deck 100 in a compressive, sandwich-type arrangement. This arrangement not only secures the upper portion structure 12 and lower portion structure 14 to the rear deck 100, but advantageously serves to secure the structures directly to each other. With this fastening method, there is no relative motion between the structures upon installation.

Figure 4:
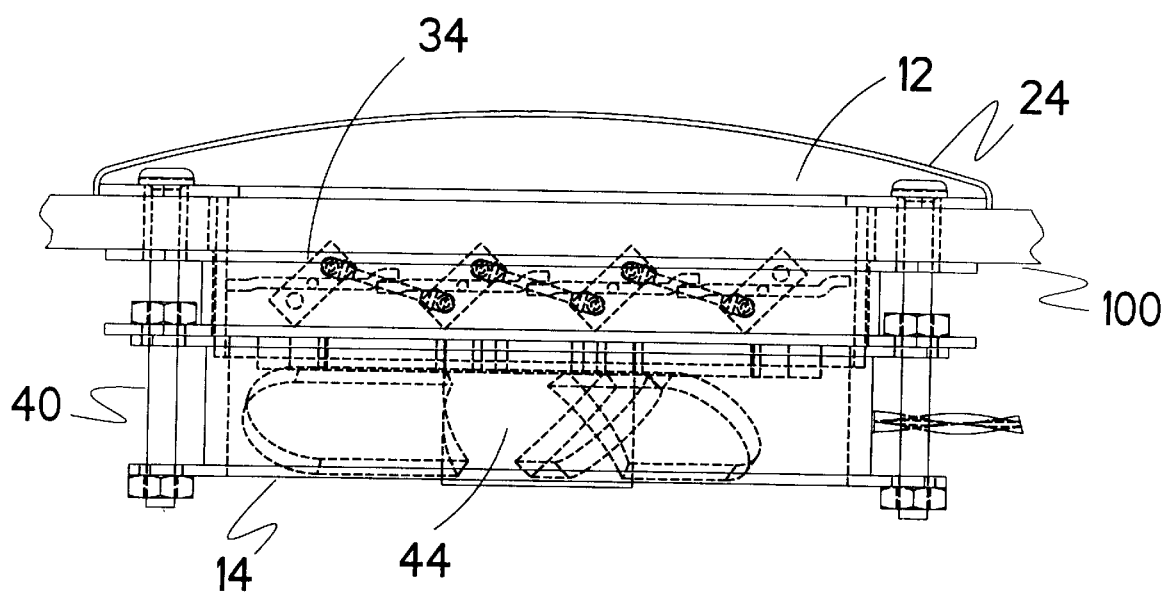
FIG. 4 is a cross-sectional end view showing the top portion and bottom portion secured to the rear deck of an automobile.

For purposes of installation, an opening is cut through the rear deck 100, as illustrated in FIG. 4, of an automobile. The inner dimensions of the opening approximate the outer dimensions of aperture 18. The upper portion structure 12 operates as a flange that overlies the immediate area on the rear deck 100 that surrounds the opening. The flange operating as a seal between the passenger compartment and the trunk compartment causing the passage of air to be drawn through the aperture opening.

In this embodiment, aperture guards 24 extend over the aperture 18. The aperture guards 24 prevent items from entering the aperture 18 and damaging the louvers 20 or the fan 44 (shown in FIG. 4) disposed therebelow. The aperture guards 24 form a grill that allows passage of air, but prevents foreign items from passing therethrough.

The device 10 is placed within the deck installation opening with structures 12 and 14 held in place by fasteners 40. The flange of the upper structure 12 lies against the top surface 102 of the rear deck 100. Each fastener 40 passes through each upper flange mounting hole 22 and extends through the rear deck top surface 102. Similarly, the lower portion structure 14 is placed against the bottom surface 104 of the rear deck 100 with a fastener 40 passed through each of the lower flange mounting holes 28 for securing to the rear deck bottom surface 104.

The mounting holes 22, 28 are coaxially-aligned and movement of the compression bolts is prevented by fastening nuts threadably disposed on each bolt. Tightening of the fastening nut places the rear deck 100 in compression, with the bolt head seated against the rear deck top surface 102 and the fastening nut seated against the rear deck bottom surface 104. An electric fan 44 is mounted beneath the louvers 20. In one embodiment, the fan 44 is powered by the 12-volt DC high volume fan capable of transferring about 18 cubic feet per minute.

Each securement bracket 34 is arranged parallel to an accompanying louver 20. Additionally, louver 20 includes a linking projection 42 shaped to engage one of several included connecting rods 36. The connecting rods extend between the louvers 20 and, as a result, the louvers move as a unit. The louvers 20, which may be activated by gravity forces or biasing springs, occupy a closed position when at rest. However, when an included fan 44 (shown in FIG. 4) is activated, the louvers 20 will rotate into an open position. As stated above, the louvers 20 move in unison; the connecting rod 36 causes the louvers to open simultaneously. As the louvers 20 move to occupy an open position, air flows through past the louvers and through the aperture 18.

After use, the louvers 20 rotate back into a closed position. An optional spring, not shown, may be used to direct the louver closing rotation. Use of a spring allows the louvers 20 to close tightly and remain sealed even if the pressure in the trunk or passenger space changes. To this end, a spring biased louver, not shown, may be attached to any of the connecting rods 36 or even a biasing spring, not shown, may be attached to the end support of a selected louver 20. The aperture guards 24 shown extending across the upper surface 16 prevent unwanted items from falling into the aperture 18 or otherwise jamming the louvers 20.

The lower portion 14 is shown partially encompassing the control mechanism 32. As seen in this view, the lower portion 14 operates to support the upper portion 12 in the proper position and provide additional protection for the securement brackets 32. By partially covering the control mechanism 34, the lower portion 14 creates a barrier that keeps items stored in an automobile trunk compartment from interfering with the motion of the securement brackets 32 and the associated louvers 20.

Figure 5:
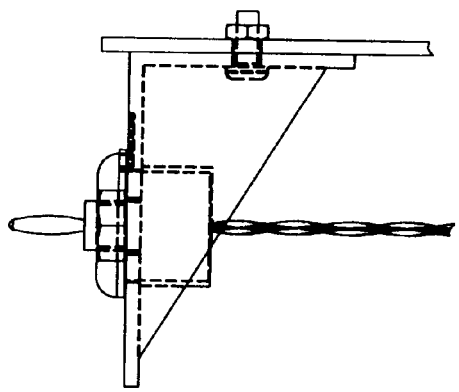
FIG. 5 is a perspective view of a dash mounted control switch.
Figure 5:
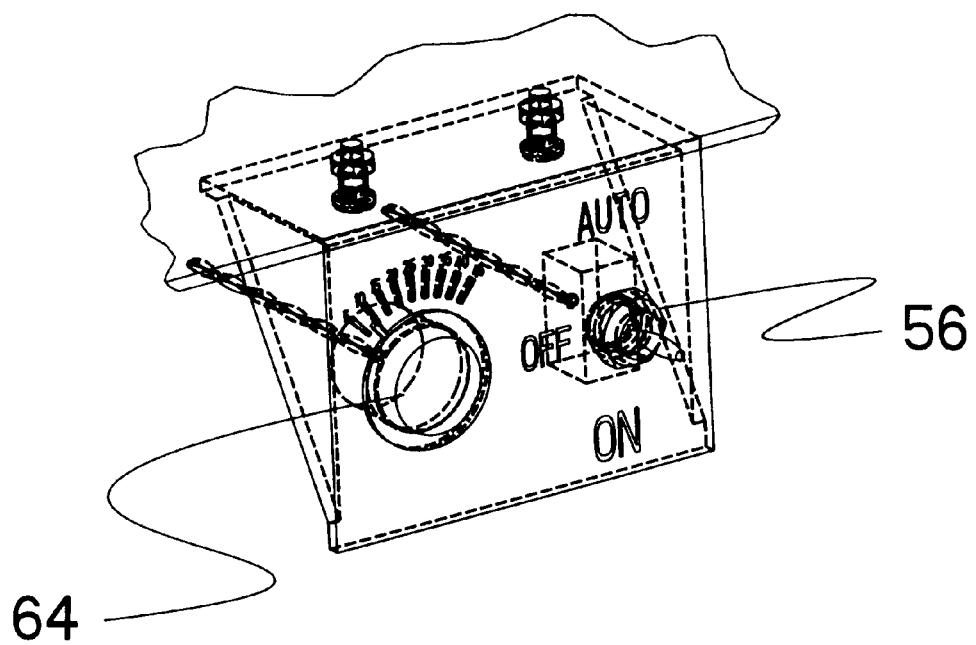
Figure 6:
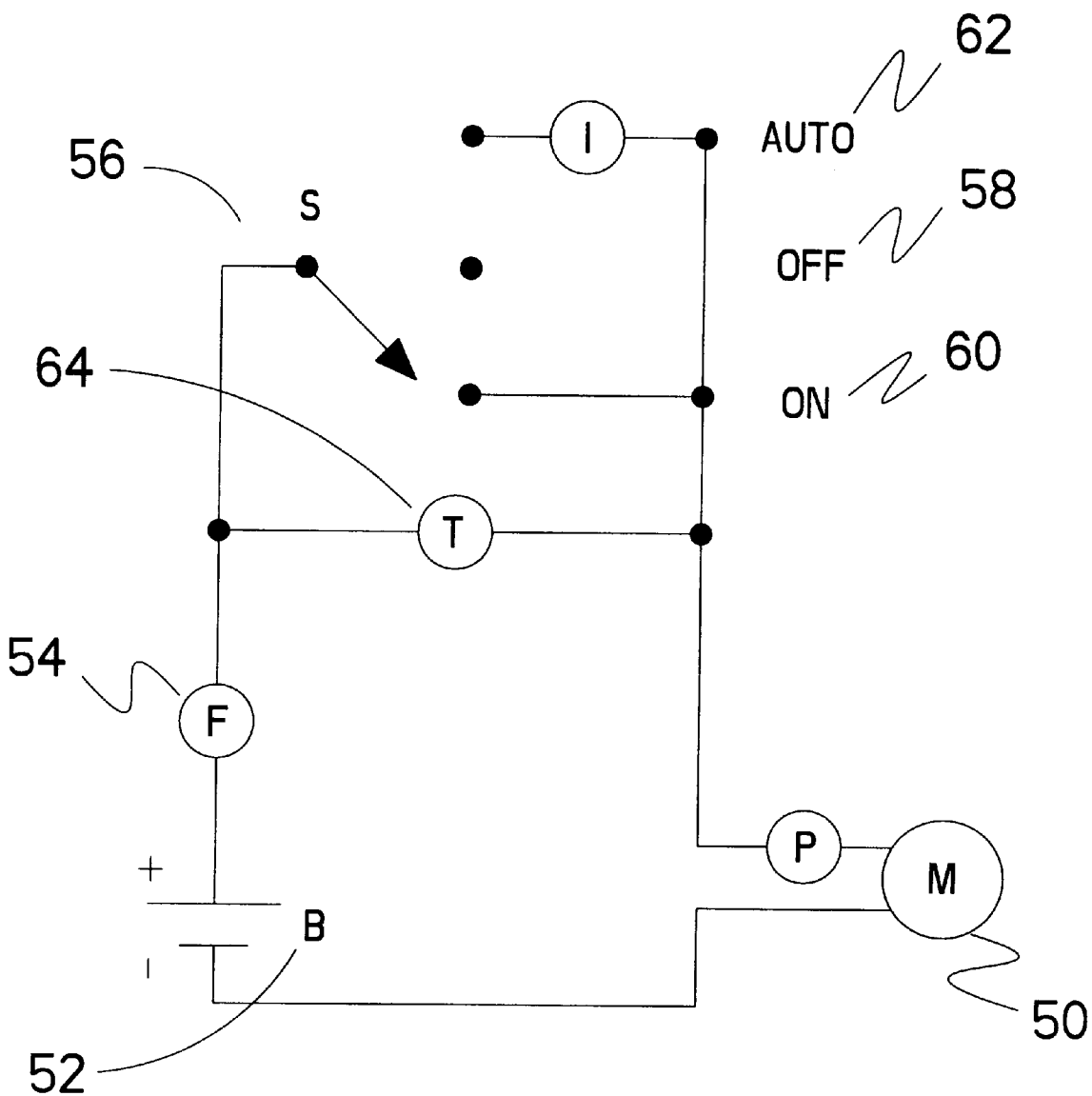
FIG. 6 is an electrical schematic of the invention.
Figure 7:
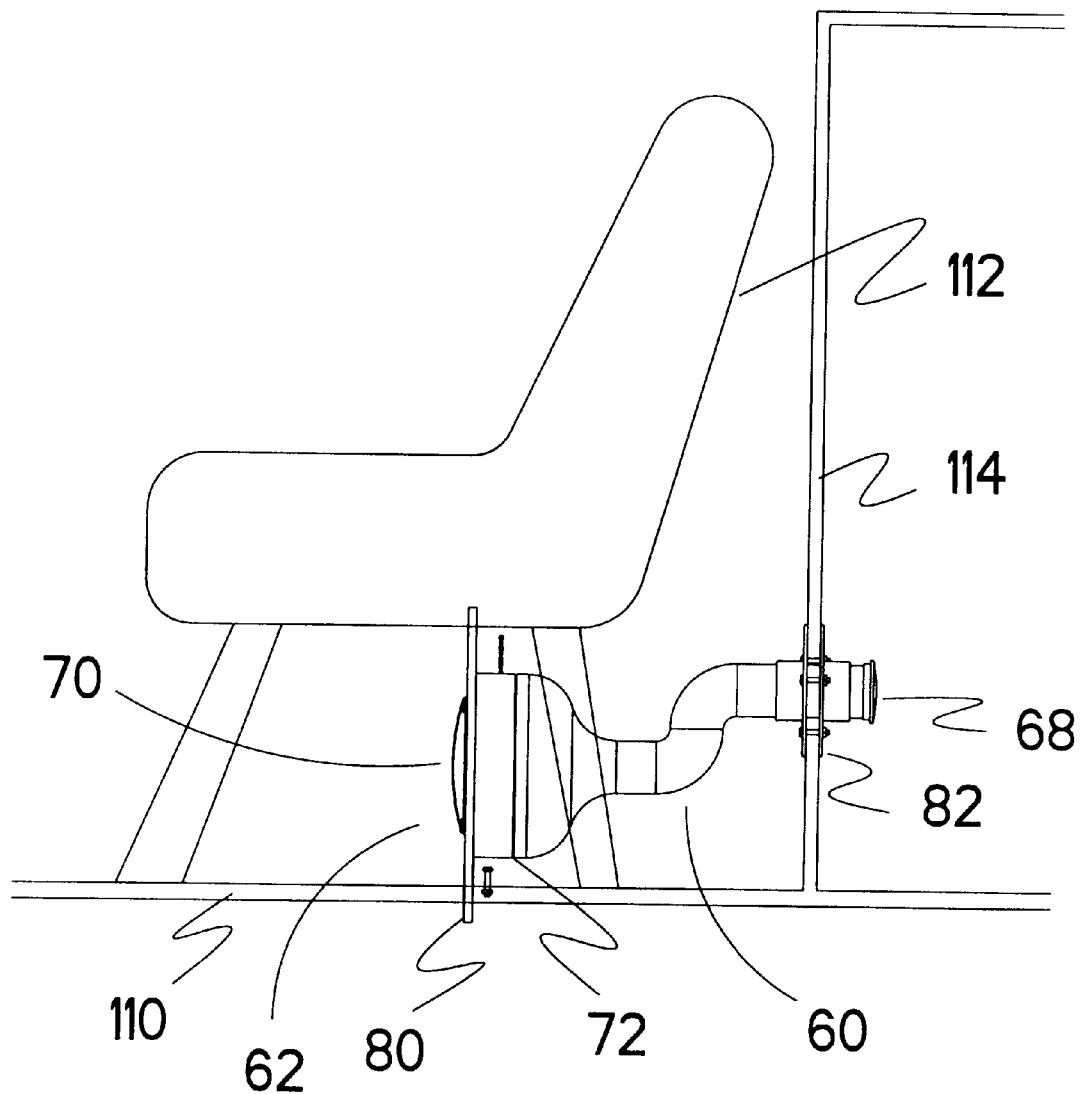
FIG. 7 is a pictorial view of a cannister embodiment of the instant invention.
Figure 8:
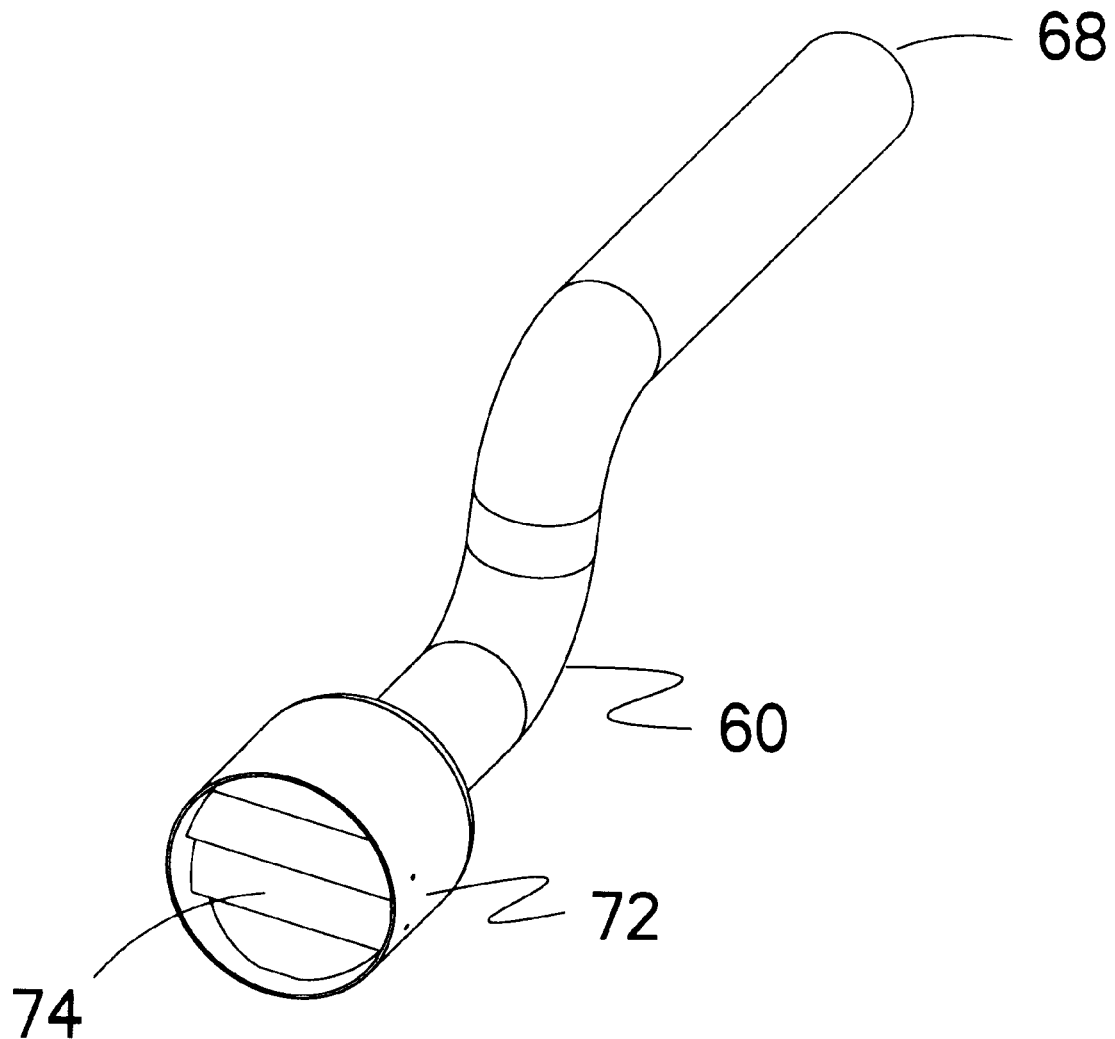
FIG. 8 is a perspective view of the canister embodiment.
Figure 9:
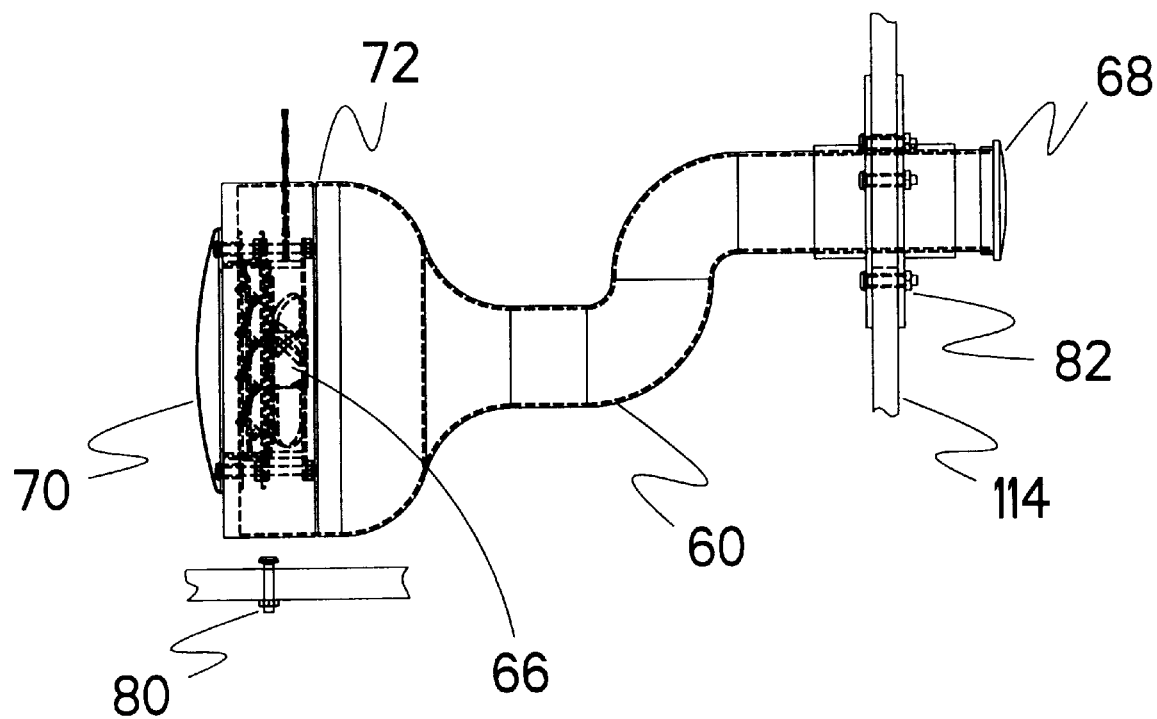
FIG. 9 is a cross sectional side view of the canister embodiment.
Figure 10:
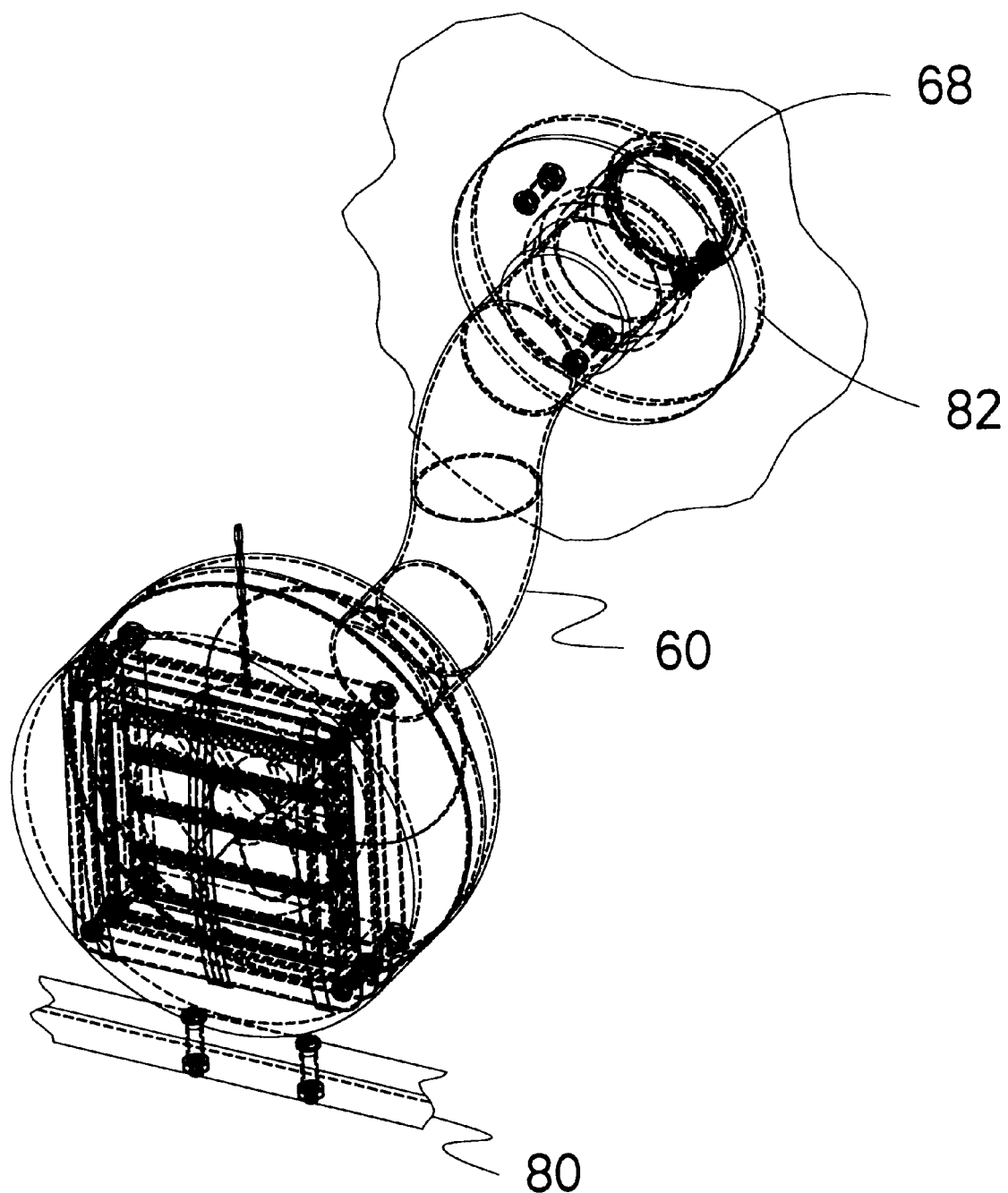
FIG. 10 is a cross sectional corner view of the canister embodiment.

Referring to FIGS. 5 and 6, the motor 50 of the fan is connected to the car battery 52 with a fuse protection. A switch 56 provides and OFF mode as depicted by numeral 58, an ON mode as depicted by numeral 60, and an AUTO mode as depicted by numeral 62. The ON mode 59 allows the fan to operate on demand. In this instance the fan may be left on while the consumer is in a store wherein conditioned air within the automobile may be transferred to the trunk space. A timer 64 provides an adjustable time period for operation. The AUTO mode 62 is placed in series with an ignition circuit allowing operation only while the engine is running. Alternately, the fan may be activated automatically by a temperature-sensing switch. Such a switch would also include a temperature gauge, and a fan operation indicator.

Referring now to FIGS. 7–10, an alternative embodiment of the instant invention is depicted. A concealable duct 60 or canister-type ventilation system is disclosed having an intake portion 62 positioned along the floor 110 of an automobile rear seat 112. As with the first embodiment, a high volume fan 66 allows forced ventilation with the flexible duct 60 having an exhaust port 68 inside the trunk space. This embodiment is preferred for automobiles having a hatch back or similar design that lack a conventional rear deck. Aperture guards 70 extend over the aperture housing 72 to prevent items from entering the aperture housing and damaging louvers 74, or the fan 66.

The canister can be secured beneath the rear seat 112 by a bracket 80 which fastens to the floor of the vehicle. The exhaust port is placed through the wall 114 and held in place by coupling bracket 82. The canister duct 60 is preferably constructed from a flexible tube providing a universal installation. Alternatively, the canister duct 60 is formed from rigid tubes that are rotatable to conform to a particular angular position. The purpose of the canister embodiment is the same as the primary embodiment, to transfer conditioned air from the passenger compartment to the trunk compartment.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What I claim is:

1. In combination with an automobile having a passenger compartment air conditioning system and a trunk partially bounded by a substantially-horizontal rear deck, an automobile trunk air conditioning device comprising:

an upper bracket having a mounting flange with an upper surface and a lower surface and a centrally disposed aperture;

a plurality of louvers pivotally disposed within said aperture, said louvers effectively blocking air flow through said aperture when said louvers are rotated into a normally closed position and allowing uninhibited air flow through said aperture when said louvers are rotated into an open position;

a lower bracket having a mounting flange with an upper surface and a lower surface and a centrally disposed aperture, said lower bracket operatively associated with said upper bracket, said lower bracket being vertically spaced apart from and substantially horizontally aligned with said upper bracket;

a high volume DC powered electric fan secured within said aperture of said lower bracket;

switch means for controlling electrical power to said electric fan;

fastening means for securing said upper bracket to a top surface of a automobile rear deck and for securing said lower bracket to a bottom surface of said automobile rear deck said device selectively conditions air within said trunk while said passenger compartment air conditioning system is in operation.

2. The automobile trunk ventilation device according to claim 1 wherein said upper bracket includes an aperture guard to inhibit items from insertion into said aperture.

3. The automobile trunk ventilation device according to claim 1 wherein said plurality of louvers are coupled together allowing for uniform rotation of louvers.

4. The automobile trunk ventilation device according to claim 1 wherein said switch means is further defined as a dash mounted electrical switch providing a manual on/off control.

5. The automobile trunk ventilation device according to claim 4 wherein said electrical switch is placed in series with the automobile's ignition switch to discontinue electrical power when the automobile is turned off.

6. The automobile trunk ventilation device according to claim 1 wherein said fastening means is defined as a plurality of self-tapped threaded screws.

7. The automobile trunk ventilation device according to claim 1 wherein said fastening means is defined as adhesive.

* * * * *